US012645255B2

(12) United States Patent
Zhang et al.

(10) Patent No.: US 12,645,255 B2
(45) Date of Patent: Jun. 2, 2026

(54) PROTECTION MECHANISM FOR AXIS OF ROTATION

(71) Applicant: iBenzer Inc., College Point, NY (US)

(72) Inventors: Lina Zhang, College Point, NY (US); Jiayue Xu, College Point, NY (US)

(73) Assignee: iBenzer INC., Garden City, NY (US)

( * ) Notice: Subject to any disclaimer, the term of this patent is extended or adjusted under 35 U.S.C. 154(b) by 56 days.

(21) Appl. No.: 18/747,048

(22) Filed: Jun. 18, 2024

(65) Prior Publication Data
US 2024/0427374 A1 Dec. 26, 2024

Related U.S. Application Data

(60) Provisional application No. 63/523,061, filed on Jun. 24, 2023.

(51) Int. Cl.
*G06F 1/16* (2006.01)
(52) U.S. Cl.
CPC .................................. *G06F 1/1628* (2013.01)

(58) Field of Classification Search
CPC ........................................................ G06F 1/10
See application file for complete search history.

(56) References Cited

U.S. PATENT DOCUMENTS 11,150,701 B1 * 10/2021 Zhang ................... G06F 1/1628

* cited by examiner

*Primary Examiner* — Jerry Wu
(74) *Attorney, Agent, or Firm* — iPA & iPM

(57) ABSTRACT

A protective case for a foldable computing device, comprising a first and second cover and/or a first and second rim configured to enclose and to capture corresponding portions of the computing device's main body and its perimeter. A pair of endcaps, with a disk like profile and a preset thickness, are attached to the case to cover ends of the computing device's axis of rotation ranging among fully closed to fully opened positions. An overall circumference of the disk like profile is set to be larger than a sectional profile of the foldable computing device's axis of rotation. The endcaps can be fitted with sleeves and can be removable and replaceable if needed.

16 Claims, 11 Drawing Sheets

102

102

102

104

104

104

106

106

104

109

108     110

PROTECTION MECHANISM FOR AXIS OF ROTATION

CROSS-REFERENCES TO RELATED APPLICATIONS

This application claims priority to an U.S. Provisional Application No. 63/523,061 filed on Jun. 24, 2023, which is hereby incorporated herein by reference in its entirety.

TECHNICAL FIELD

The present disclosure, in some embodiments thereof, relates to a protection mechanism for axis of rotation. More specifically, the present specification discloses a case with a mechanism to protect axis of rotation for a foldable device, with a range spanning from a fully closed position to a fully opened position.

BACKGROUND OF THE DISCLOSURE

A foldable device often comprises at least two pieces that can rotate or fold toward each other via a shaft or an imaginary axis of rotation. In this type of configuration, the joint, whether it is a shaft and/or a simple axis, is often somewhat exposed and vulnerable. The present disclosure is for a case that protects the joint as well as the body of the device. It applies to laptop as well as to foldable phones, tablets, and so on.

BRIEF SUMMARY OF EMBODIMENTS

The present disclosure, in some embodiments thereof, relates to a protection mechanism for axis of rotation. More specifically, the present specification discloses a case with a mechanism to protect axis of rotation for a foldable device, with a range spanning from a fully closed position to a fully opened position.

A protective case for a foldable computing device comprises a first cover configured to enclose and to capture at least a first portion of the computing device's main body and its perimeter. A first rim is configured to enclose and to capture at least a portion of the first cover and its perimeter. A second cover is configured to enclose and to capture at least a second portion of the computing device's main body and its perimeter. A second rim is configured to enclose and to capture at least a portion of the second cover and its perimeter. The second rim further comprises a pair of endcaps, with a disk like profile and a preset thickness, to cover corresponding ends of the computing device's axis of rotation ranging from a fully closed position to a fully opened position.

The first cover and the first rim can interlock with one another, and/or be fused into a single piece.

The second cover and the second rim can interlock with one another and/or be fused into a single piece.

The overall circumference of each endcap can be set to be larger than a sectional profile of the computing device's axis of rotation by some amount.

Each endcap can be fitted with a sleeve.

Each endcap can be affixed to any of the first and second cover and/or first and second rims via a figure-ground snap connection.

A protective case for a foldable computing device comprises a first cover configured to enclose and to capture at least a first portion of the computing device's main body and its perimeter. A first rim is configured to enclose and to capture at least a portion of the first cover and its perimeter. The first rim further comprises a pair of endcaps, with a disk like profile and a preset thickness, to cover corresponding ends of the computing device's axis of rotation ranging from a fully closed position to a fully opened position. A second cover is configured to enclose and to capture at least a second portion of the computing device's main body and its perimeter. A second rim is configured to enclose and to capture at least a portion of the second cover and its perimeter.

A protective rim for a foldable computing device is configured to capture at least a portion of the computing device's main body and its perimeter. The rim further comprises a pair of endcaps, with a disk like profile and a preset thickness, covering corresponding ends of the computing device's axis of rotation ranging from a fully closed position to a fully opened position.

An endcap, comprising a disk like profile with a preset thickness, is configured to be attached to a case for a foldable computing device, with an overall circumference of the disk like profile larger than a sectional profile of the foldable computing device's axis of rotation by a preset amount.

The pair of endcaps are attached to the case for the foldable computing device to cover corresponding ends of the computing device's axis of rotation ranging from a fully closed position to a fully opened position.

Each endcap can be fitted with a sleeve.

Each endcap can be attached to the case via a figure-ground snap connection.

Each endcap can be manufactured to be fused to the case.

Other features and aspects of the disclosure will become apparent from the following detailed description, taken in conjunction with the accompanying drawings, which illustrate, by way of examples, the features in accordance with embodiments of the disclosure, The summary is not intended to limit the scope of the disclosure, which is defined solely by the claims attached hereto.

BRIEF DESCRIPTION OF DRAWINGS

The present disclosure, in accordance with one or more various embodiments, is described in detail with reference to the following figures. The drawings are provided for purposes of illustration only and to merely depict typical or example embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale.

Some of the figures included herein illustrate various embodiments of the disclosure from different viewing angles. Although the accompanying descriptive text may refer to such views as "top," "bottom" or "side" views, such references are merely descriptive and do not imply or require that the disclosure be implemented or used in a particular spatial orientation unless explicitly stated otherwise.

The figures are not intended to be exhaustive or to limit the disclosure to the precise form disclosed. It should be understood that the disclosure can be practiced with modification and alteration, and that the disclosure be limited only by the claims and the equivalents thereof.

DETAILED DESCRIPTION OF EMBODIMENTS OF THE DISCLOSURE

The description and/or disclosure that follow comprise illustrative systems, methods, techniques, sequence instructions, and computing machine program products that embody illustrative embodiments. In the following description, for purpose of explanation, numerous specific details are set forth in order to provide an understanding of various embodiments of the inventive subject matter.

From time-to-time, the present disclosure is described herein in terms of example environments. Description in terms of these environments is provided to allow the various features and of the disclosure to be portrayed in the context of an exemplary application. It will be evident, however, to one of ordinary skill in the art how the disclosure can be implemented in different and in alternative environments, with or without specific details. In general, well-known instruction instances, protocols, structures, and techniques have not been shown in great detail.

Unless defined otherwise, all technical and scientific terms used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present specification discloses a foldable case for a device with a mechanism to protect its joints where rotation takes place.

Figure 18:
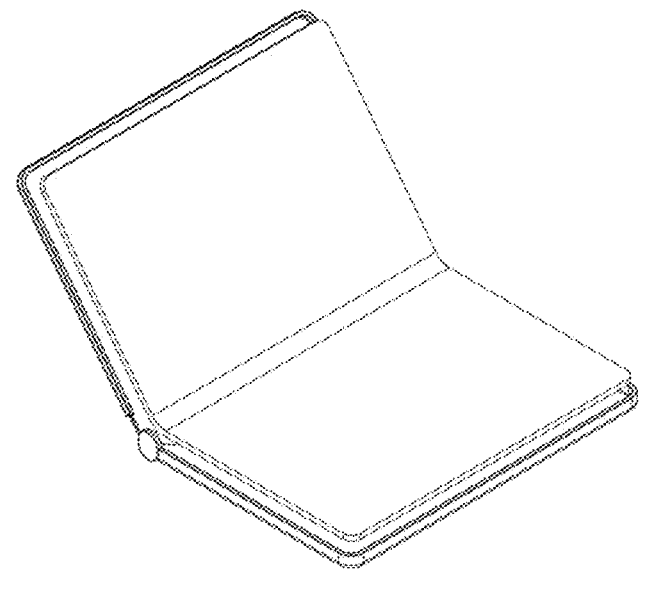
FIG. 18 illustrates a foldable tablet fitted with a protective case according to some embodiment of the present disclosure

For simplicity reasons, most of the following descriptions are using a laptop as an example, which often has a screen portion (referring to as a lid), and a keyboard portion (referring to as a base). More generally speaking, one can refer to a case with the terms of a first cover and a second cover, each protecting a corresponding portion of a computing device. This configuration applies to foldable phones, tablets (FIG. 18), as well as to laptops.

FIGS. 1-6 are schematic illustrations of a protective case comprising multiple layers according to some embodiments of the present disclosure. A lid portion of a case 100 comprises a first rim layer 101 and a first cover layer 103. A base portion of the case 100 comprises a second cover layer 105 and a second rim layer 107. When the case is assembled, layers 101 and 103 can be fitted, interlocked, and/or fused together to partially cover the top surface of the laptop and engage the top panel around its corners and perimeters. Layers 105 and 107 can be fitted, interlocked, and/or fused together to partially cover the base of the laptop and engage the base around its corners and perimeters.

Figure 3:
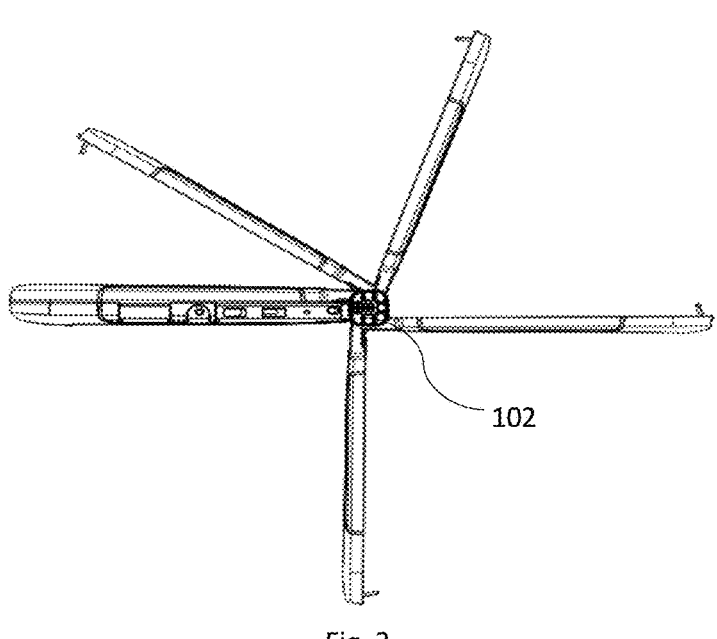
FIG. 3 is a side view of a laptop within a case in various positions.
Figure 4:
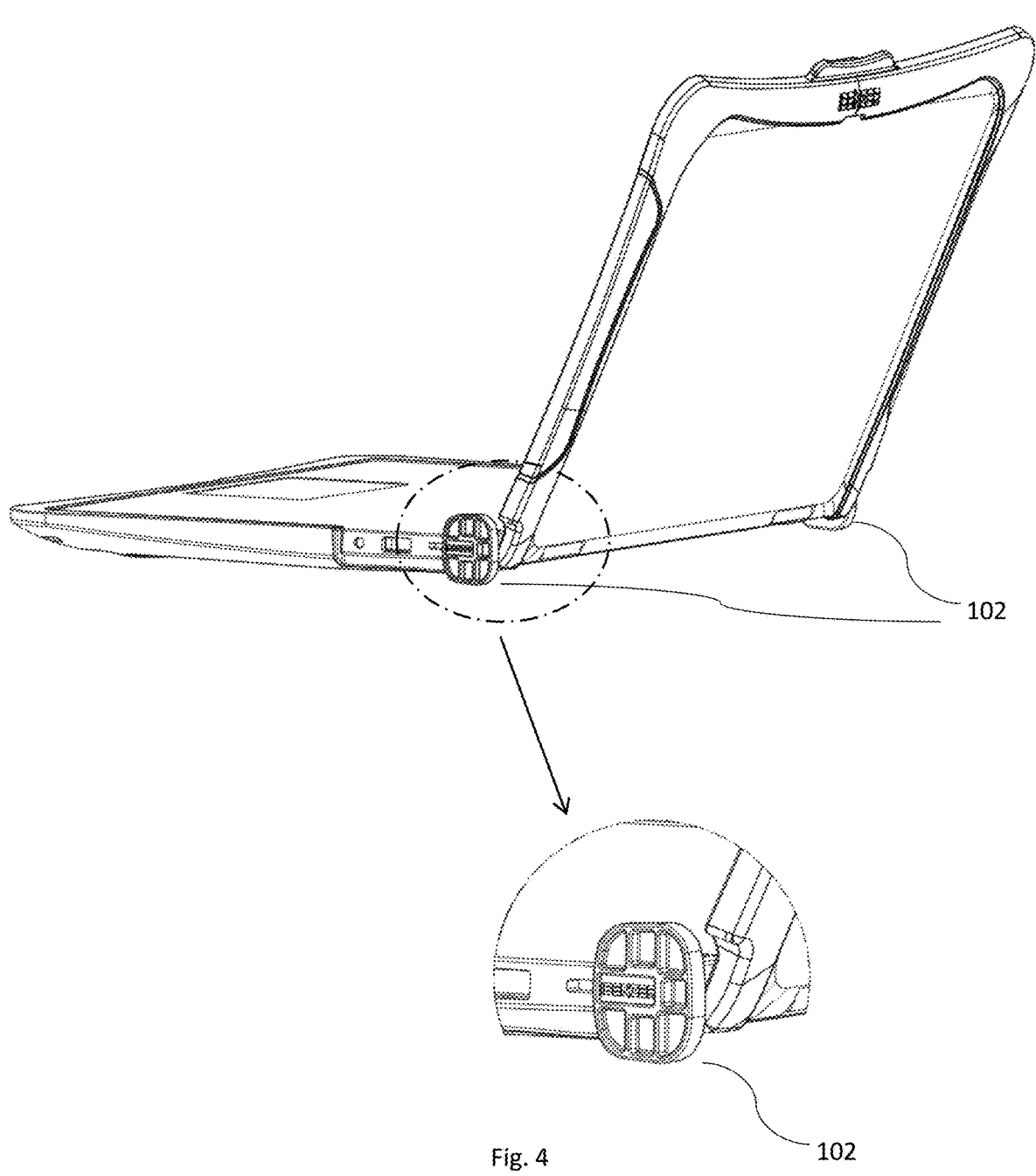
FIG. 4 is a perspective back view thereof with the endcap region enlarged.
Figure 7:
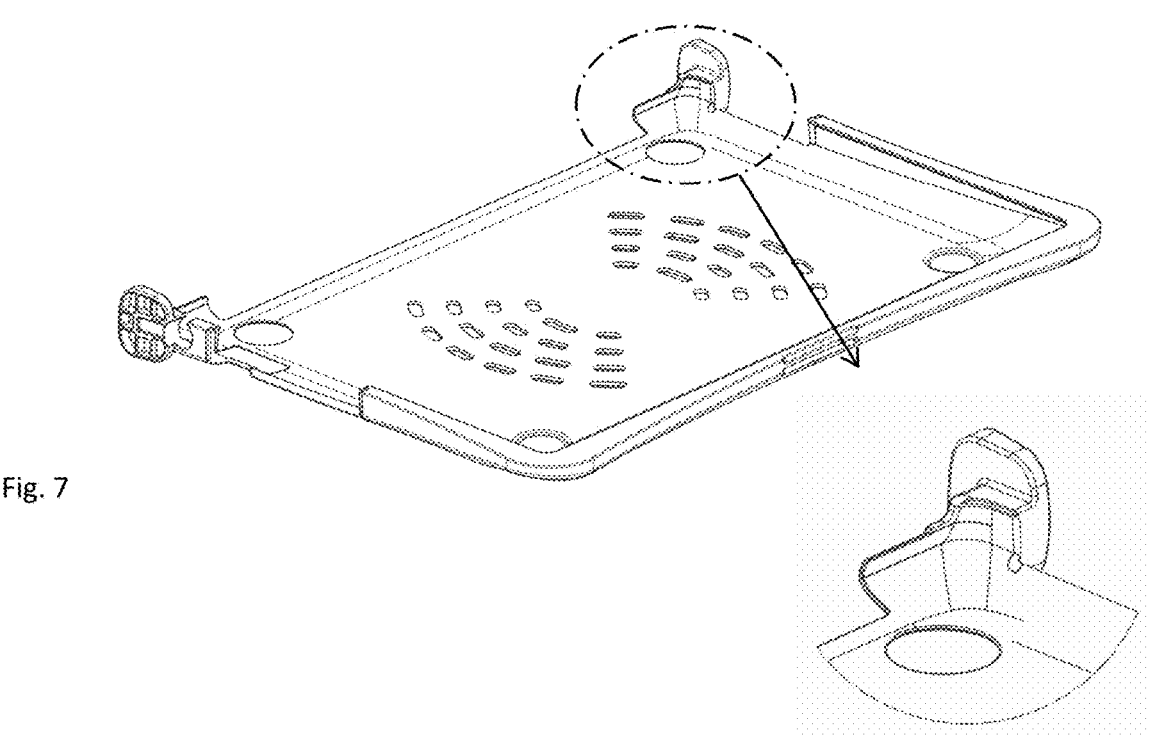
FIG. 7 illustrates a configuration wherein the endcap is manufactured to be fused with a section of the case, thus forming a single cover piece.

A main function of a foldable device is to open and to close. Folding or relative rotation among parts of the device usually happens around a physical shaft or around a designated axis. FIG. 3 illustrates various rotational positions of a laptop between its lid and base. A pair of endcaps 102, with disk like profiles and with a preset thickness, are configured onto second rim layer 107 and positioned to cover or to cap over both end portions of the laptop's shaft of rotation. It should be noted that endcaps 102 can also be configured onto either layer among 101, 103, 105, and 107. FIG. 7 illustrates an exemplary embodiment where layers 105 and 107 are fused/molded together into a single layer, with a pair of endcaps 102 directly manufactured as part of its molding for the same layer. Layer 107 in FIG. 1 by itself can be directedly affixed to the device without any other layers in play. Different configurations to position and/or to install the endcaps will be discussed more in detail in the following corresponding sections.

Dimensions of endcaps 102 and its functionalities are illustrated in FIGS. 3-8. In perspective and side views in FIGS. 3 and 4, the overall circumference of the endcap's disk like profile is larger than the sectional profile of the shaft region by a preset amount. The end section of the shaft of rotation cannot be seen in these two figures for the very reason that it is shielded behind and thus protected by the endcap 102.

Figure 5:
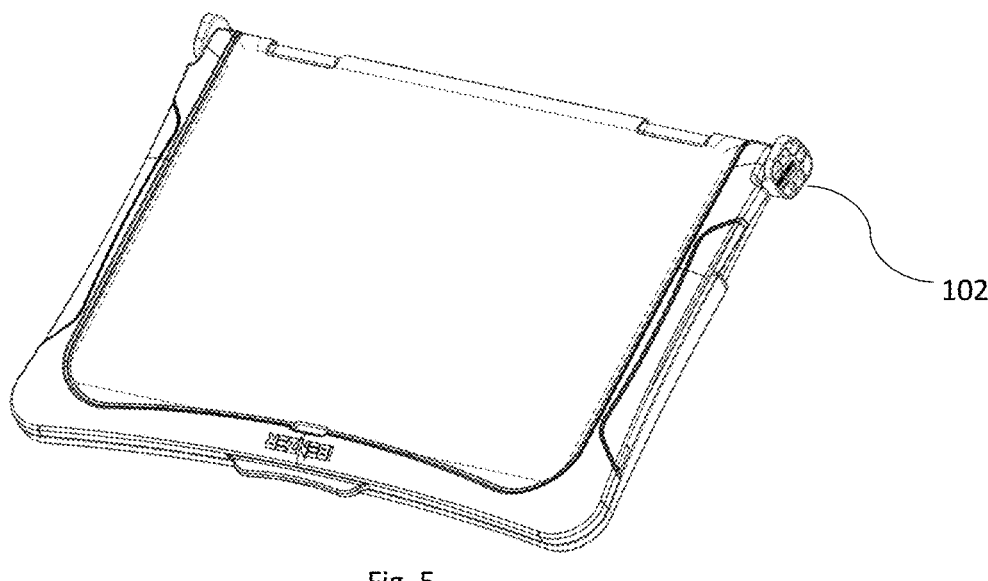
FIG. 5 is closed view of the case.
Figure 6:
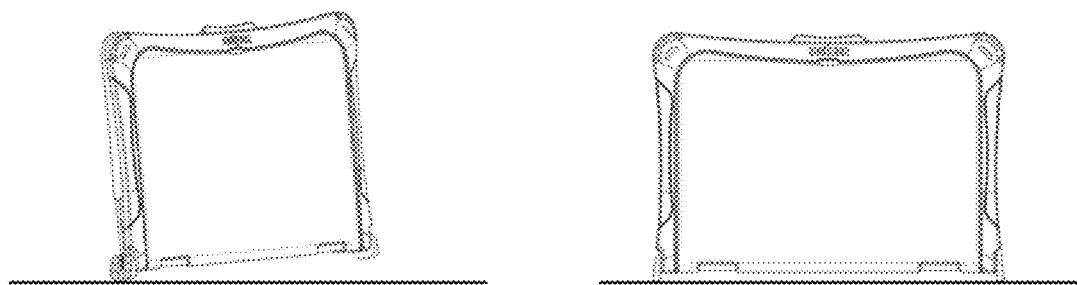
FIG. 6 illustrates various scenarios of the case with endcaps that shield the device from impact.
Figure 6:
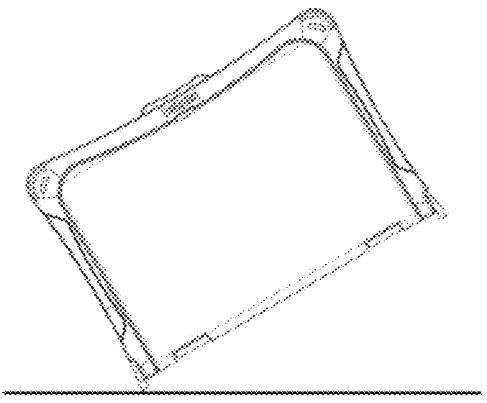

In whichever way the device is in contact with a surface, the pair of endcaps 102, in essence, isolate the shaft of the device and raise the shaft slightly above that particular surface in contact. Several animated examples are shown in FIGS. 5 and 6. By laying the laptop down flat, upright, sideways or at an angle against a surface area, the pair of endcaps 102 serve as cushions and buffers in between. They protect the device, especially its shaft of rotation, from direct impact.

Figure 8:
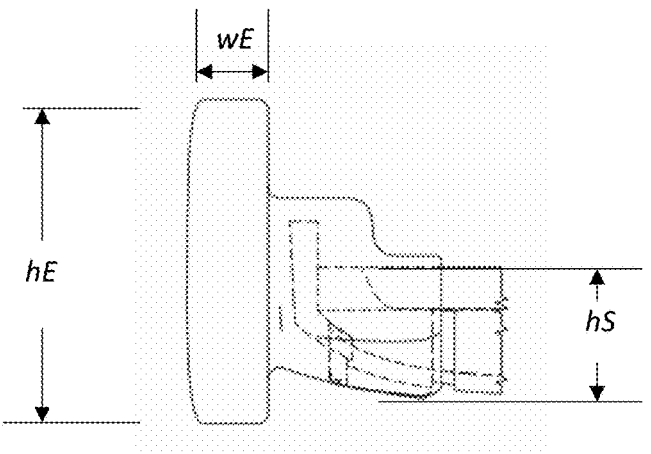
FIG. 8 illustrates a back side view and top view of the endcap.
Figure 8:
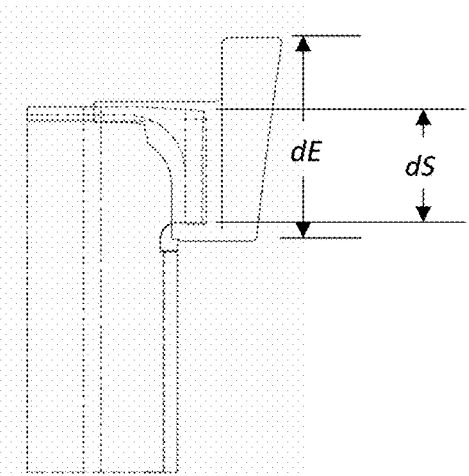
Figures 9, 10:
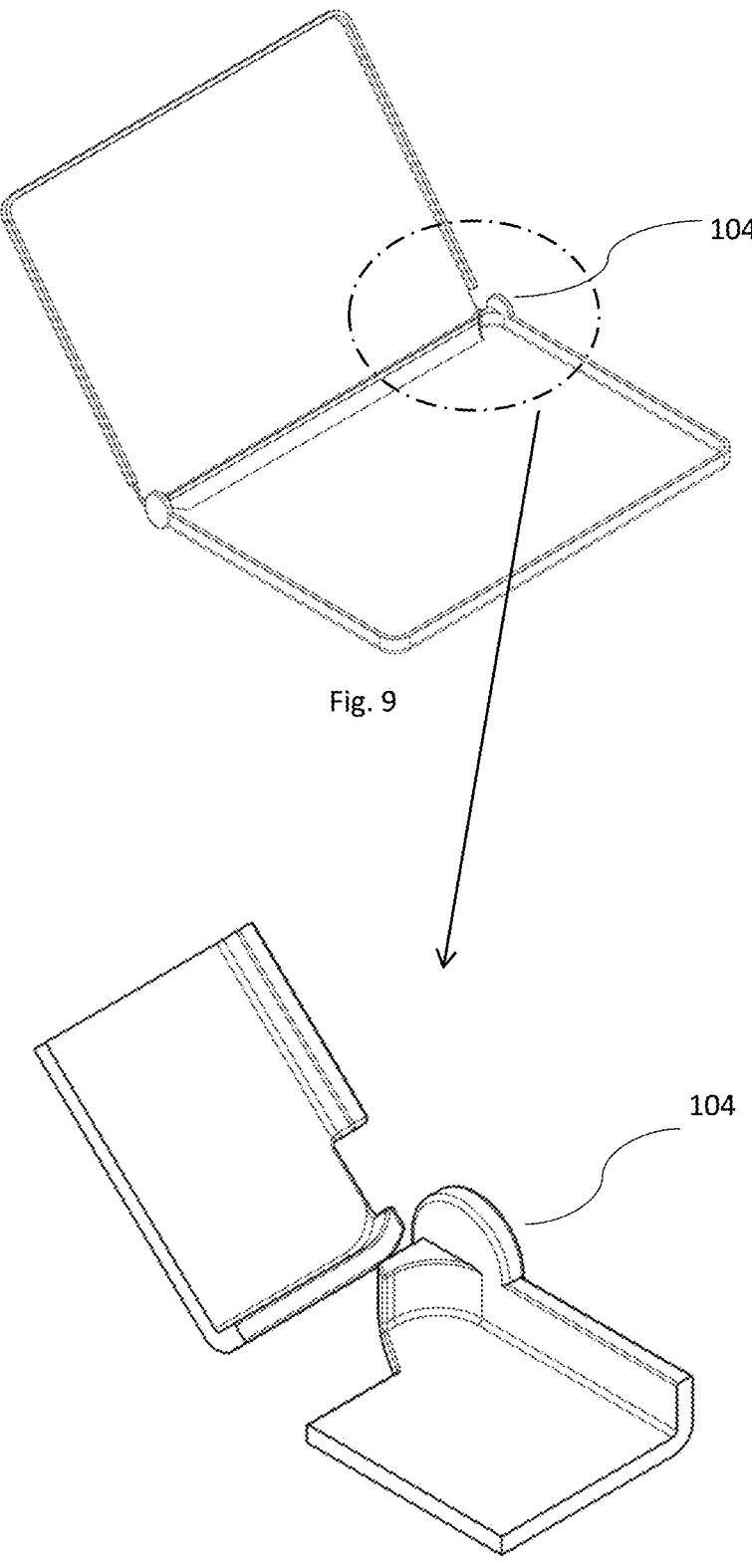
FIG. 9 illustrates a perspective inside view of a case with a pair of endcaps.
FIG. 10 is a perspective enlarged view of the endcap.
Figure 11:
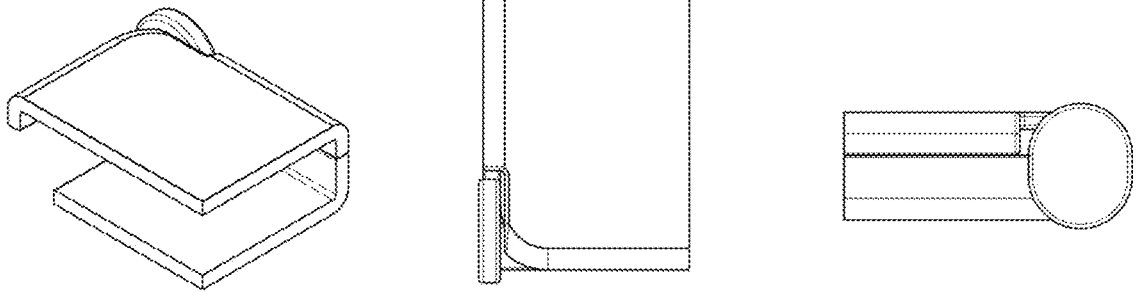
FIG. 11 is a side by side perspective, top, and side views of the endcap in a closed position.
Figure 12:
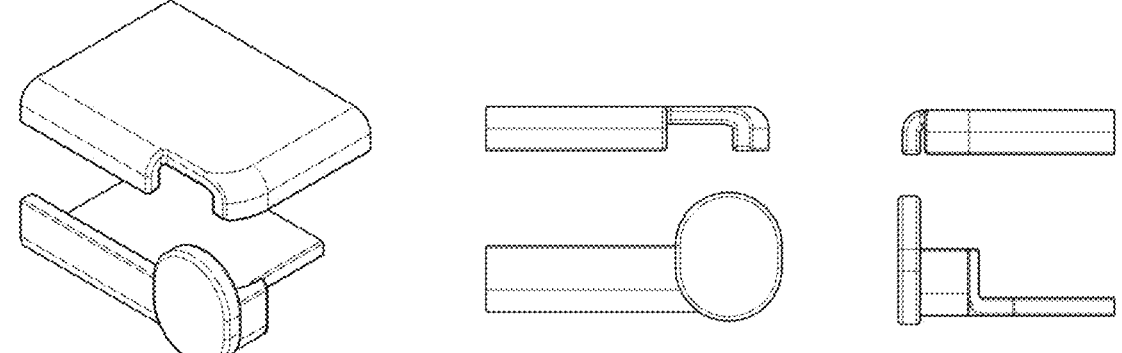
FIG. 12 is a side by side perspective, side and front views of the endcap in a opened position.
Figure 13:
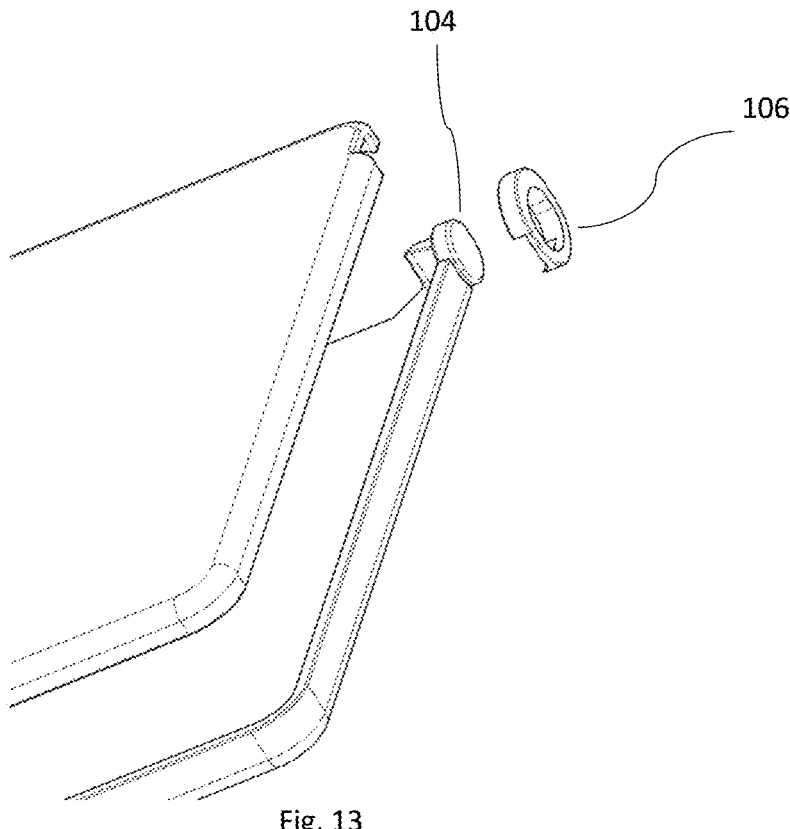
FIG. 13 is a perspective view of an endcap with a sleeve in a removed position.
Figure 14:
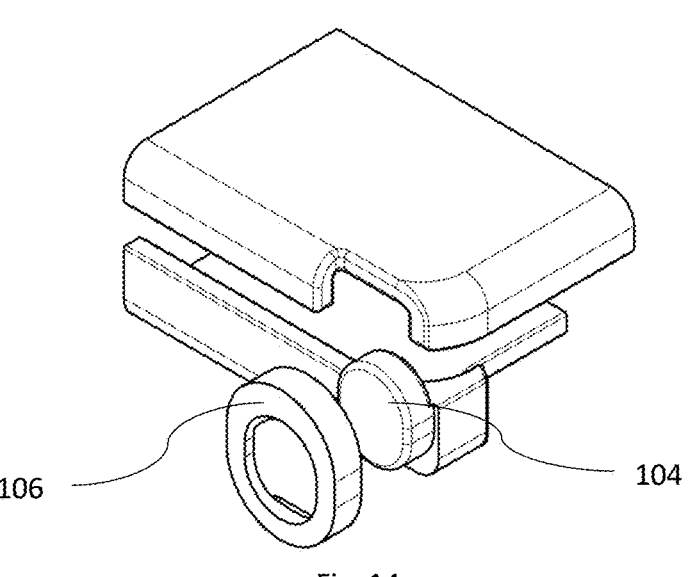
FIG. 14 is a perspective enlarged view thereof.

FIG. 8 illustrate sectional views of the endcap and the shaft region that it protects. In general, height of the endcap $hE$ is larger than the overall height of the shaft region $hS$. Depth of the endcap $dE$ is larger than the overall depth of the shaft region $dS$. Absolute values for height and depth depend on the size and thickness of the device, so long as $dS$ varies within $dE$ in range and $hS$ varies within $hE$ in range. Width of the endcap $wE$ can vary independently.

Size and shape of an endcap are determined mainly based on considerations for its general purpose. When an endcap is affixed onto a particular layer of the case, for instance layer 107 in FIG. 1, layers 101, 103 and 105 can be tailored to accommodate and to complement its size enlargement. FIGS. 4, 9, 11, and 12 shows examples of cutout regions on opposing layers, so that the case can close properly.

FIGS. 9-14 illustrate schematics of a case with endcaps 104 which can serve as an anchor for a sleeve 106. Sleeve 106 can be fitted onto the endcap 104 either temporarily or permanently. They can be made with same or different materials. This multi-part configuration preserves the original basic functionality of the endcap 104 but allows for more flexibility for the sleeve 106 to vary in size, shape, material, esthetic appearance, and so on.

Figure 1:
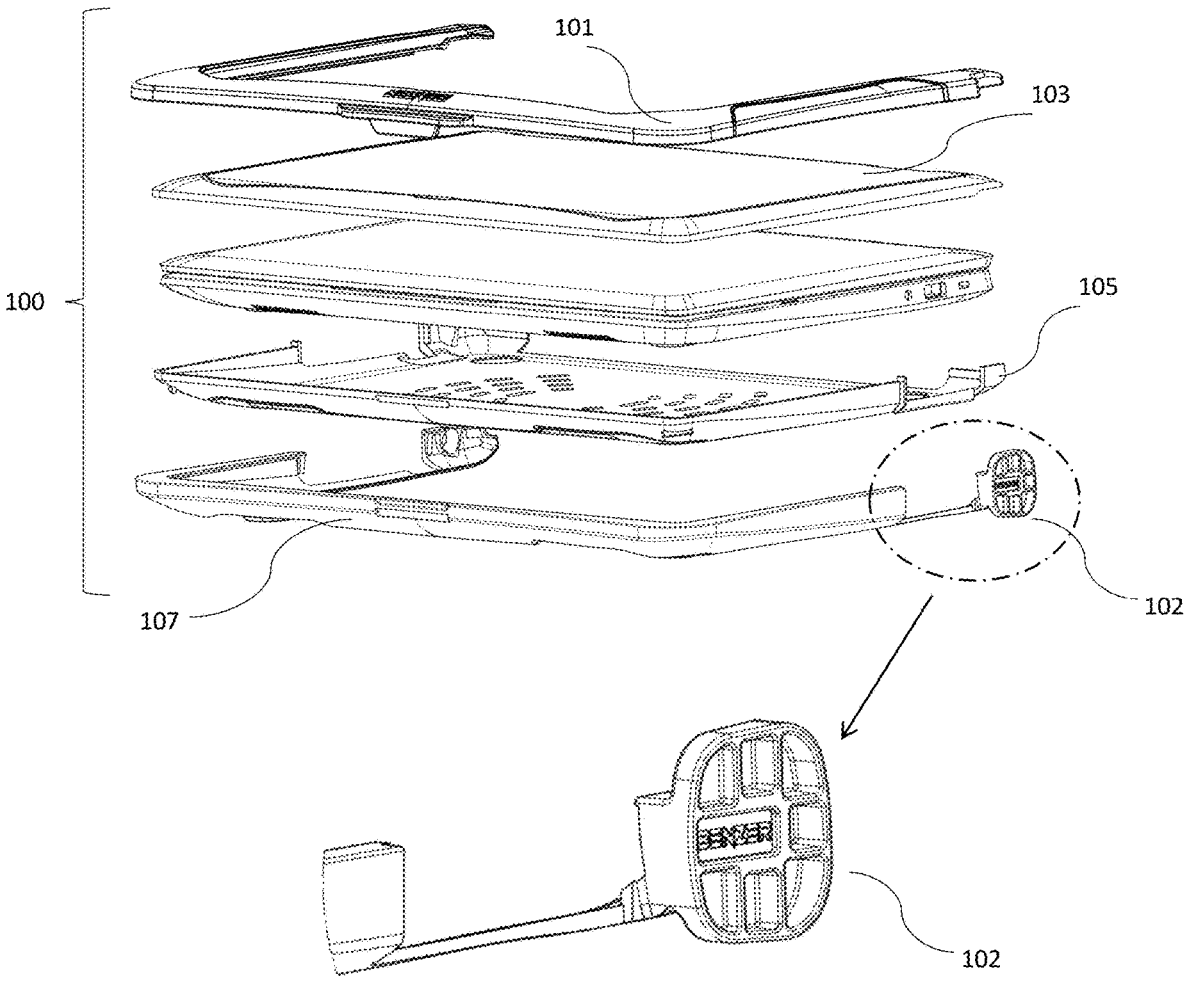
FIG. 1 is an exploded perspective view of a laptop encased among layers of a protective case with an endcap region enlarged.
Figure 2:
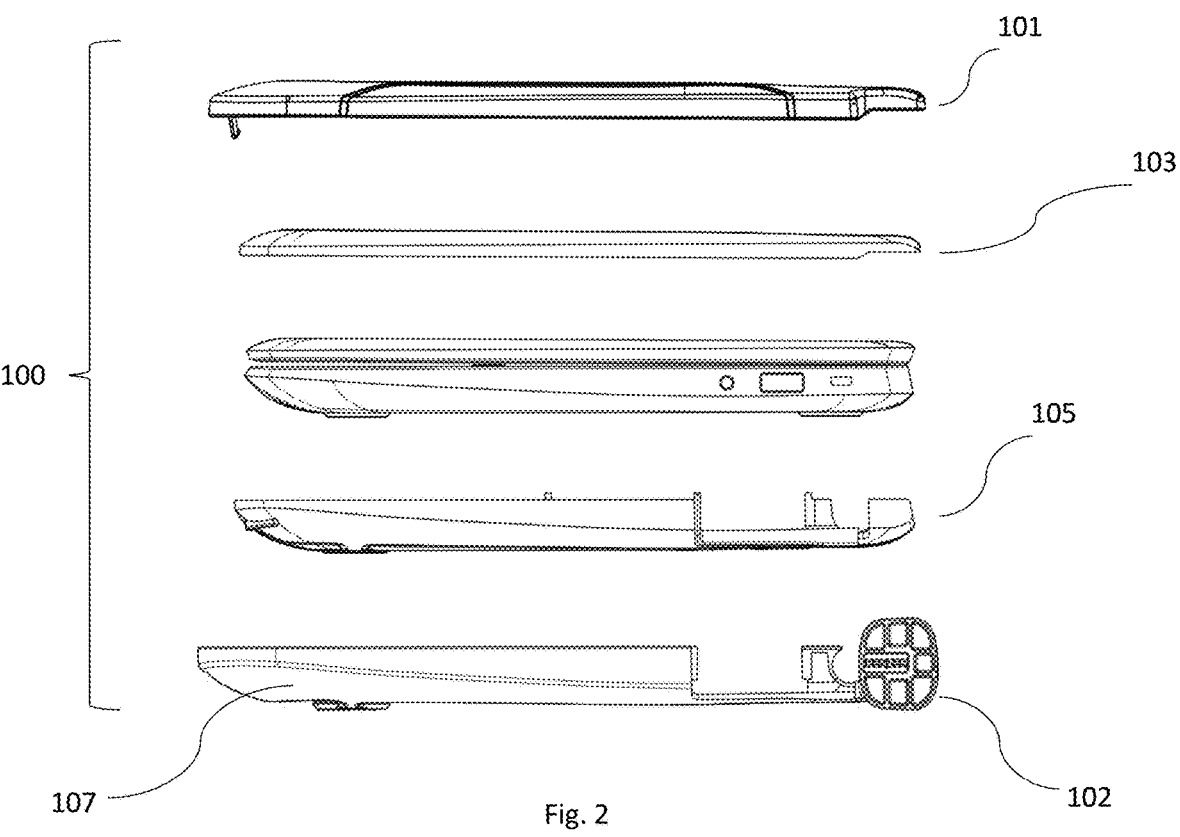
FIG. 2 is an exploded side view thereof.
Figure 15:
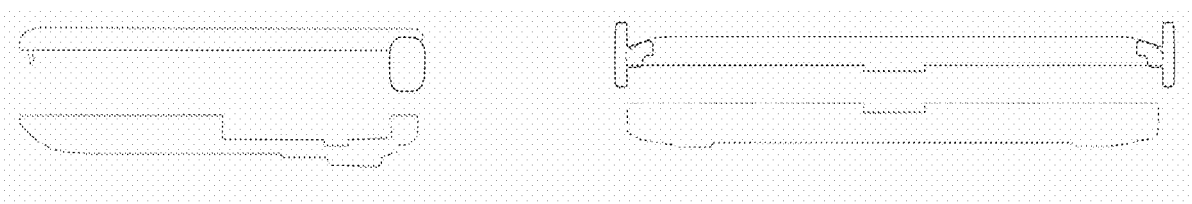
FIG. 15 is a side and front view of a pair of endcaps affixed to a lid of a case.
Figure 16:
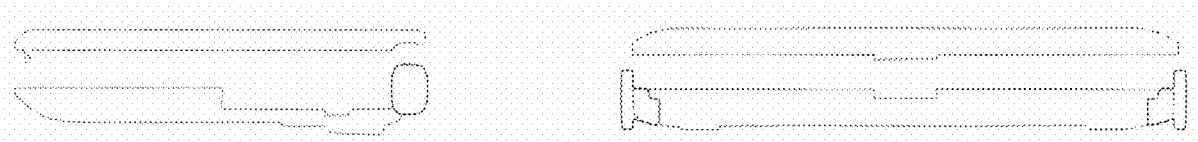
FIG. 16 is a is a side and front view of a pair of endcaps affixed to a base of a case.
Figure 17:
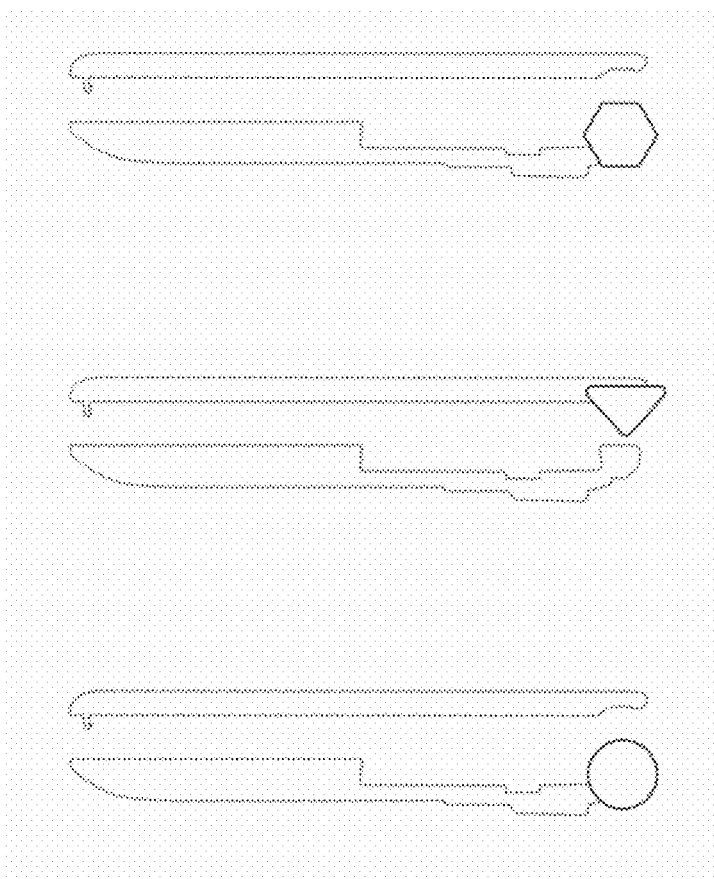
FIG. 17 illustrates a variation of endcaps in different shapes.

FIGS. 15-17 illustrates configuration variations where endcaps can be affixed to either the lid or the base. Endcaps can be in different geometric shapes or even irregular shapes as shown in FIG. 1.

Figure 19:
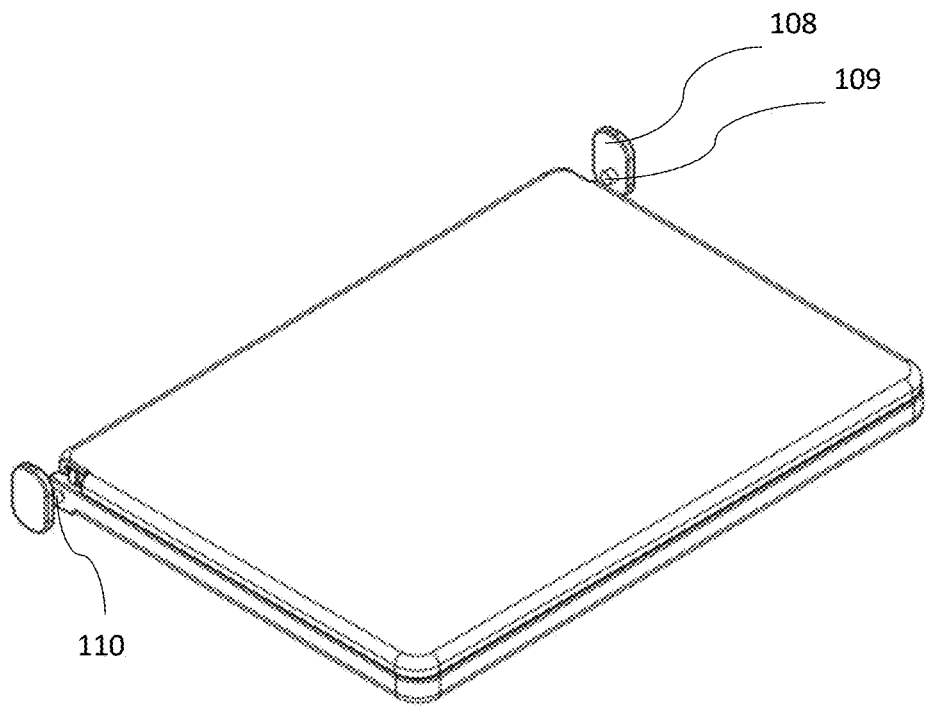
FIG. 19 shows a case with a pair of snap-on endcaps.
Figure 20:
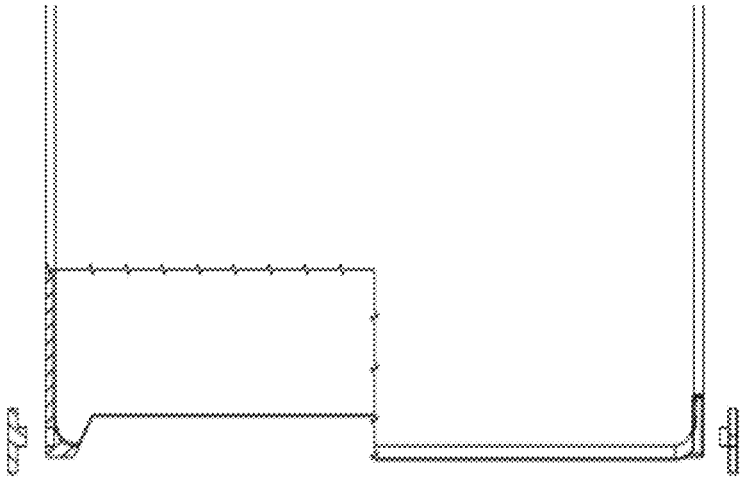
FIG. 20 shows sectional and enlarged views of the snap-on endcaps with a figure-ground type of connection.
Figure 20:
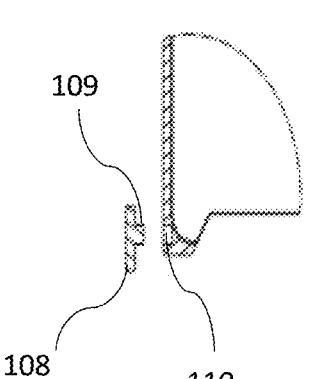

FIGS. 19 and 20 shows a pair of endcaps that can be snap into a complimentary receiving slot in any layer of the case, so long as the endcap sits outside of the shaft or an axis of rotation. Endcap 108 comprises a protrusion or button 109, which snaps into a slot 110 on any layer of the case. The button/slot snap connection is a type of a figure/ground configuration with two corresponding parts interchangeable. The physical actual loci of a snap connection can also be varied slightly so long as the endcaps sits at the desired locations after fitting. Removable endcaps or endcap sleeves allow for replacement in case of damage. If a permanently affixed endcap is damaged, it can also be covered with a removable sleeve.

The protective case and the endcaps may be manufactured from a variety of materials including thin metal, such as stainless steel, titanium, aluminum or any metal alloy, rigid fabric, carbon fiber, epoxy resin, graphite, rubber, plastic, silicon, or any combination thereof.

Plastic comprises a wide range of synthetic or semi-synthetic polymerization materials, such as any one or more of the following in combination: Polypropylene (PP), Polyethylene (PE), Polyurethane (PU), Ethylene-Vinyl Acetate (EVA), polystyrene, high impact polystyrene, polyethylene terephthalate, nylon, Silicone, acrylonitrile butadiene styrene (ABS), Bayblend® blends, and polyvinylidene chloride (PVC). Plastics can also be made with organic condensation, additional polymers, and/or other additive substances to improve performance or for economic reasons.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to achieve the desired features of the present disclosure. Also, a multitude of different constituent module names other than those depicted herein can be applied to the various partitions.

Although the disclosure is described above in terms of various exemplary embodiments and implementations, it should be understood that the various features, aspects and functionality described in one or more of the individual embodiments are not limited in their applicability to the particular embodiments with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A protective case for a foldable computing device, comprising:

a first cover configured to enclose and to capture at least a first portion of the computing device's main body and its perimeter;

a first rim configured to enclose and to capture at least a portion of the first cover and its perimeter;

a second cover configured to enclose and to capture at least a second portion of the computing device's main body and its perimeter; and a second rim configured to enclose and to capture at least a portion of the second cover and its perimeter, wherein the second rim further comprises a pair of endcaps with each endcap affixed onto a corresponding corner region, abutting each end of a shaft around which the first and second cover rotates, wherein each endcap comprises a disk like profile with a preset width, a preset depth and height that is larger than corresponding sectional depth and height of the shaft, so that an overall circumference of the disk like profile of each endcap is larger than a sectional circumferential profile of the shaft by a preset amount.

2. The protective case for a foldable computing device of claim 1, wherein the first cover and the first rim interlock with one another and/or are fused into a single piece.

3. The protective case for a foldable computing device of claim 1, wherein the second cover and the second rim interlock with one another and/or are fused into a single piece.

4. The protective case for a foldable computing device of claim 1, wherein each endcap is fitted with a sleeve.

5. The protective case for a foldable computing device of claim 1, wherein each endcap is manufactured to be fused with the second rim.

6. The protective case for a foldable computing device of claim 1, wherein each endcap is affixed to any of the first and second cover and/or first and second rims via a figure-ground snap connection.

7. A protective case for a foldable computing device, comprising:

a first cover configured to enclose and to capture at least a first portion of the computing device's main body and its perimeter;

a first rim configured to enclose and to capture at least a portion of the first cover and its perimeter, wherein the first rim further comprises a pair of endcaps, with each endcap affixed onto a corresponding corner region, abutting each end of a shaft around which the first and second cover rotates, wherein each endcap comprises a disk like profile with a preset width, a preset depth and height that is larger than corresponding sectional depth and height of the shaft, so that an overall circumference of the disk like profile of each endcap is larger than a sectional circumferential profile of the shaft by a preset amount;

a second cover configured to enclose and to capture at least a second portion of the computing device's main body and its perimeter; and a second rim configured to enclose and to capture at least a portion of the second cover and its perimeter.

8. The protective case for a foldable computing device of claim 7, wherein the first cover and the first rim interlock with one another and/or are fused into a single piece.

9. The protective case for a foldable computing device of claim 7, wherein the second cover and the second rim interlock with one another and/or are fused into a single piece.

10. The protective case for a foldable computing device of claim 7, wherein each endcap is fitted with a sleeve.

11. The protective case for a foldable computing device of claim 7, wherein each endcap is manufactured to be fused with the first rim.

12. The protective case for a foldable computing device of claim 7, wherein each endcap is affixed to any of the first and second cover and/or first and second rims via a figure-ground snap connection.

13. A protective rim for a foldable computing device configured to capture at least a portion of the computing device's main body and its perimeter, wherein the rim further comprises a pair of endcaps, with each endcap affixed onto a corresponding corner region abutting each end of a shaft, wherein each endcap comprises a disk like profile with a preset width, a preset depth and height that is larger than corresponding sectional depth and height of the shaft, so that an overall circumference of the disk like profile of each endcap is larger than a sectional circumferential profile of the shaft by a preset amount.

14. The protective rim for a foldable computing device of claim 13, wherein each endcap is fitted with a sleeve.

15. The protective rim for a foldable computing device of claim 13, wherein each endcap is affixed onto the rim via a figure-ground snap connection.

16. The protective rim for a foldable computing device of claim 13, wherein each endcap is manufactured to be fused with the rim.

* * * * *